United States Patent [19]
Ganz

[11] 3,769,029
[45] Oct. 30, 1973

[54] METHOD OF MAKING A THERMOPLASTIC FOOD PRODUCT

[75] Inventor: Alexander J. Ganz, Wilmington, Del.

[73] Assignee: Hercules Incorporated, Wilmington, Del.

[22] Filed: May 26, 1971

[21] Appl. No.: 147,193

[52] U.S. Cl................426/342, 426/364, 426/512
[51] Int. Cl............................................. A23l 1/00
[58] Field of Search.............. 99/17, 100, 56, 100 P, 99/108, 80, 126, 134, 141

[56] References Cited
UNITED STATES PATENTS

| | | | |
|---|---|---|---|
| 3,114,639 | 12/1963 | Rivoche | 99/100 |
| 3,479,190 | 11/1969 | Ganz | 99/139 |
| 3,336,139 | 8/1967 | Mech et al. | 99/124 |
| 3,073,705 | 1/1963 | Rivoche | 99/229 |

Primary Examiner—Raymond N. Jones
Assistant Examiner—William A. Simons
Attorney—William S. Alexander

[57] ABSTRACT

A process of making a thermoplastic shaped food product wherein an admixture of a thermoplastic hydroxypropyl cellulose polymer having an M. S. of at least 2 and an intrinsic viscosity of about 0.5 to 20 and a solid food product are thermoplastically shaped under temperature and pressure conditions sufficient to cause the admixture to soften and flow into the desired shape and, during said shaping, vaporizing any excess of initially present water from the admixture to provide a food product having a water content not exceeding 15 weight percent, cooling the shaped admixture and recovering the resulting shaped food product.

9 Claims, No Drawings

METHOD OF MAKING A THERMOPLASTIC FOOD PRODUCT

The food product is thermoplastic and exhibits improvement over the food material component, per se, particularly in respect of one or more of chewing properties, rehydration properties, shelf stability, and physical integrity; and it is stable during storage and handling but readily softens or disintegrates under chewing or cooking conditions. The thermoplastic product can be reshaped, if desired, which is particularly advantageous from the standpoint of reshaping scrap or reject portions for reuse.

Product of the above process is also provided.

This invention relates to the manufacture of improved food products. In one aspect, this invention relates to the manufacture of novel food products by thermoplastically shaping a mixture of a solid food material and a hydroxypropyl cellulose polymer to provide product having a characteristics markedly improved over those of the food material component, per se. In another aspect this invention relates to food product of the above described manufacture. Other aspects will be apparent in light of the accompanying disclosure and the appended claims.

Artificial foods, and food products containing extender materials, as for example, cellulose gum, starch, and the like, have been known for some time such as disclosed in U.S. Pats. Nos. 3,085,020, 3,114,639, 3,163,541, 3,336,139, 3,434,843, and others.

In accordance with the invention, a process is provided for the manufacture of an improved food product, which comprises thermoplastically shaping an admixture of a thermoplastic hydroxypropyl cellulose polymer having an M.S. of at leat 2, and a solid food material, in a polymer to food material weight ratio, based on said food product, of from 0.01:1 to 1:1, during said shaping, vaporizing any water from said admixture initially present therein in excess of a predetermined proportion up to 15 weight percent; and recovering resulting shaped food product.

Any suitable food material can be utilized with the polymer component to form food product in practice of the invention such as proteins, carbohydrates, starch, or food products which in their natural form already contain some structure such as meat, fruit, or vegetables. The food material component may also contain additional ingredients often added to modify the organolectic and storage properties of food products such as corn syrup, fat, surfactants, salts, color, flavor, antioxidants, and non-thermoplastic gums; and while the use of these additional ingredients is not essential, they can be utilized in accordance with the particular texture, taste, and storage properties desired. Further exemplary, and now preferred, food material components are sucrose, meats, vegetables, fruits, nuts, cereals, milk powder, protein concentrates, and mixtures thereof.

Some foot components, per se, of the food product of the invention inherently exhibit good texture such as meats, poultry, fish, vegetables, fruits, and nuts, whereas others may have very little texture, such as milk powder, protein (soy), gluten, corn flour, and sugar. However, in all events, the food product of the invention exhibits texture characteristics improved over those of the food material component, per se.

Although the proportion of hydroxypropyl celulose polymer incorporated into the food product is any suitable value within the above described range, those polymer-food material ratios now preferred are generally within the range of from about 0.05:1 to 0.3:1.

By "M.S." herein is meant the average number of molecules of propylene oxide reactant combined with the hydroxypropyl cellulose per anhydroglucose unit. Although the M.S. value is in all instances at least 2, it is more preferably within the range of from about 3 to 5 and more often 3.8 to 4.2, although higher values up to about 10 are advantageously utilized in some instances, dependent upon the particular food material component. At M.S. values below 2, any degree of thermoplasticity of the polymer component is too slight, and hence unsuitable for its utilization in practice of the invention; the food product, under such conditions, generally being substantially non-cohesive and devoid of the requisite physical integrity. A more detailed description of M.S. values is set forth in U.S. Pat. No. 3,278,521.

Molecular weight is further definitive of the hydroxypropyl cellulose polymer component, and is generally in the order of from 60,000 to 1,200,000, more often depicted by an intrinsic viscosity with range from about 0.5 to 20, preferably from 1 to 15, and a water solution (weight percent polymer in water) viscosity within the range of from about 50 centipoises as a 10 percent solution to about 4,000 centipoises as a 1 percent solution, and preferably from about 200 centipoises as a 10 percent solution to about 3,000 centipoises as a 1 percent solution. Generally, the lower the molecular weight of the polymer component, the higher is the rate at which the food product becomes pliable, and the greater is the degree of pliability accomplished, in water.

The polymer-food material admixture can be thermoplastically shaped in any suitable manner, generally by extrusion, compression molding, injection molding, or two-roll milling. Exemplary of food product shapes formed in practice of the invention are rods, filaments, sheets and tubes, by extrusion; sheets, and flake by roll milling; and cubes and animal shapes, by compression, or injection molding.

The food product of the invention is thermoplastic and exhibits improvement over the food material component, per se, particularly in respect of one or more of chewing properties, rehydration properties, shelf stability, and physical integrity; and it is stable during storage, and handling, but readily softens or disintegrates, under chewing or cooking conditions. Due to its thermoplastic properties, the food product of the invention can be reshaped, as desired, which is particularly advantageous from the standpoint of reshaping scrap or reject portions from processing the food product, for reuse.

The invention is based on my discovery that when a food material is admixed in the above described proportions, with a hydroxypropyl cellulose having the degree of thermoplasticity depicted by an M.S. of at least 2, the resulting polymer-food component admixture is also thermoplastic, and hence it can be thermoplastically shaped to form a resulting food product which is thermoplastic and exhibits the improved characteristics above described. Thus when referring herein to thermoplastically shaping, it is meant any suitable thermoforming of the polymerfood material admixture into the desired shape, and hence the step of maintaining the polymer-food material admixture under temperature and pressure conditions sufficient to cause the admixture to soften and in that softened condition, flow into the desired shape for subsequent cooling, and recovery as desired solid shaped food product. Thermoplastically shaping, per se, is well known, and is referred to in ASTM D883-69a STANDARD NOMENCLATURE RELATING TO PLASTICS, see the 1970 Annual Book of ASTM Standards.

In practice of the invention, water need not be directly added to the process system inasmuch as the polymer-food material admixture is itself thermoplastic. However, any water, initially present in the food material component, is inherently introduced into the polymer-food material admixture. Water content of the food product of the invention does not exceed about 15 weight percent inasmuch as at higher water content levels firmness, texture, and stability characteristics of the food product are generally unsatisfactory; and, in order to assure an optimum degree of those characteristics, it is often preferred that the water content be not greater than about 10 eight percent, more often in the range of from about 3 to 7 percent.

It is therefor necessary in any instance in which the water content of the polymer-food admixture exceeds 15 weight percent, which generally is due to the presence of water initially present in the food material component, that the water in excess of that 15 percent content, or in excess of any lower predetermined water content for the food product, be removed.

In contrast to prior art practice in which water is present as a plasticizer during shaping of non-thermoplastic materials, any water removal that is required in practice of the invention can be accomplished by vaporization of the water from the polymer-food material admixture concurrently with the entire shaping step, or any period thereof, thereby eliminating the need for a separate, and subsequent, water removal steep; and hence precluding the need for additional manpower and equipment normally required for the seprate drying step. Thus, in use of open shaping equipment such as a two-roll mill, operated at temperatures above 100° C., the requisite amount of water is readily evaporated from the polymer-food admixture during milling. When utilizing extrusion equipment, the water removal can be regulated by the use of a vented extruder to provide for the requisite steam escape. Alternatively, in such extrusion operation, all or part of the vaporization can be carried out as the product emerges from the hot die. Such practice is advantageously utilized in preparation of expanded or foamed product structure which results from the rapid emergence of the water vapor from the shaped polymer-food material admixture prior to the final cooling step.

It is preferred that the initial water content of the food material component be not greater than about 75 weight percent inasmuch as, at higher water content levels, efficiency of the thermoplastic shaping is often impaired by an undue porosity of the polymer-food admixture which results from the exit flow of the large volume of water vapors that must be removed.

Pressure conditions during the shaping step are advantageously adjusted to also regulate the rate of vaporization of water and to regulate, or eliminate, loss of volatile components from the polymer-food admixture during the shaping period, as desired.

In preferred practice, the polymer and food material component are admixed, preferably in finely divided particulate form, in any suitable manner, generally at an ambient temperature level below the softening point of the polymer. The resulting admixture is maintained under suitable temperature and pressure conditions for effecting the requisite thermoplastic shaping. At the end of the shaping period the resulting shaped admixture is cooled to below the softening point of the polymer component to form a resulting solid integral mass of thermoplastically shaped food product.

In general, the thermoplastic shaping is carried out at a temperature within the range of from about 100° to 250° C.; selection of a minimum temperature, being limited by the softening, or thermoforming point of the polymer, and maximum temperature being limited by the tendency of the polymer or food ingredients to darken excessively or undergo undesirable chemical change during the shaping period.

When referring herein to the softening point of the hydroxypropyl cellulose polymer component it is meant that determined by a melt index ($I_2$) method used for other thermoplastic polymers, and described in ASTM D1238, which involves determination of the amount of material which will flow through a standard size aperture at a given temperature using a standard pressure as the driving force. A melt index ($I_2$) value of from 2 to 6 is considered satisfactory for extrusion operations, but for compression molding or roll mill forming, lower values of 1 or less are advantageously utilized. However, the melt flow of the polymer is significantly increased by the presence of a plasticizer such as propylene glycol, glycerin or water. Accordingly, such plasticizers are often advantageously employed during the shaping step.

The food product of the process of the invention as readily formed into any desirable shape. Thus, products simulating spaghetti or macaroni, ground meat, breakfast cereals, candy bars, and shaped candies are advantageously prepared. Powdery materials such as milk solids, wheat flour, protein concentrates, and the like can be formed into larger particles for any desired use as for example as meat supplements; and they maintain their integrity through the cooking operation, thus imparting a more desirable texture and taste to the cooked product as compared with use of the powdered food materials, per se, as a directly added ingredient.

Further modifications of the process of the invention provide for expanded, or foamed food products. In one embodiment, the shaping step is carried out in an extruder in the presence of a small proportion of water, generally introduced into the system as an ingredient of the food material component, under such conditions that the water will vaporize from the admixture to cause expansion of the product while leaving the die; alternatively another volatile liquid with, or without, inherently present water, such as Freon, or a gas such as carbon dioxide, can be added to the extrusion system to cause expansion of the extruded product by escape, as a vapor, at the die, thus imparting a foamed structure to the admixture just prior to cooling.

The process of the invention can be advantageously applied to the manufacture of concentrates of flavors or condiments incorporated into the polymer-food material admixture as one or more of the food material ingredients for shaping; or a concentrate of medicinals, as the food material component, together with any suitable sugar flavor, which dissolve from the product, while retained in the mouth, often as a chewing-gum.

A still further modification of the process of the invention, is that providing for manufacture of food product as an edible food concentrate in the form of a film or shaped package which can be used to protect, and make handleable, other soft or partially liquid foodstuffs such as ice cream, soft candy, custards, and the like.

The food products of the invention are advantageously applied as meat extenders, breakfast cereals, snack items, fruit nuggets, shaped candies, lozenges, and the like.

The invention is illustrated with reference to the following examples, in which all percentages, and ratios, are on a weight basis unless indicated otherwise.

Example 1

Twenty grams of a hydroxypropyl cellulose flake having an M.S. of 3.7, an intrinsic viscosity of 1.5 and a water solution viscosity (5 percent) of 140 centipoises, and 80 grams of powedered non-fat milk solids (NFMS) having a water content less than 5 percent, were admixed under high speed agitation conditions in a Waring type blender for 2 minutes. The resulting admixture was introduced into, and extruded through, a Brabender extruder having a ¾ inch diameter screw. The extruder system temperatures were 125° C. in the feed zone, 150° C. in the barrel, and 175° C. in the die zone. The extrudate was formed in a slit die 1-½ inches × 0.035 inch. The resulting brown extrudate sheet, after cooling to ambient temperature, was brittle and hard, and it maintained its body for a reasonable time upon chewing. It was moderately pliable in cold water.

Fifteen grams of the resulting extrudate product was mixed with 85 grams of a ground beef mixture, the latter prepared by addition of 2 oz. of water, with seasoning, to 1 lb. of ground beef. The mixture was pan fried, and the resulting product was similar to an all beef patty, from the standpoint of flavor and texture.

In a comparable experiment wherein the above described milk powder (NFMS), per se, was incorporated into a ground beef mixture, a compact, dense, and less flavorful pan fried patty was obtained.

An attempt to extrude the above described non-fat milk solids alone, i.e., in the absence of the hydroxypropyl cellulose polymer component was unsuccessful. The milk solid particles would not extrude through the die and they became badly charred.

An attempt to similarly extrude a hydroxypropyl cellulose, alone, having an M.S. of 1.3 and a water solution viscosity of 250 centipoises (1 percent solution) was unsuccessful. The polymer could not be extruded through the die; it darkened and charred in the extruder barrel.

Example 2

Extrudate product was formed in accordance with the procedure of Example 1 except that the respective extruder temperature levels were 100°, 110°, and 120° C. The solidified extrudate had substantially the same characteristics as those of the extrudate product of Example 1.

In general, dependent upon the particular food and polymer ingredients, extrusion is carried out at temperatures advantageously within the range of from about 100° to 135° C. in the feed zone, 110° to 200° C. in the barrel, and from about 120° to 225° C. in the die zone.

Example 3

The process of Example 2 was repeated except that glycerin, as a plasticizer, was incorporated into the hydroxypropyl cellulose/NFMS mixture in relative weight proportions of 5 (glycerin), 90 (NFMS) and 10 (polymer). The solidified extrudate product, as compared with that of Examples 1 and 2, was similar in appearance and somewhat softer.

A sample of the solidified extrudate was tested as a breakfast-type cereal by breaking the extruded sheet into ½ inch × ½ inch pieces and adding milk. A palatable and chewable product was achieved which was crisp and had marked physical integrity which was retained for a longer period than that characteristic of conventional flake type breakfast cereals.

Example 4

The entire procedure of Example 1 was repeated except that the food component was a soy protein present in a polymer-soy protein weight ratio of 20:80. The solidified extrudate was pliable, tough, and maintained its body for a reasonable time upon chewing. It retained its physical integrity in both cold and hot water for 10 minutes; and it blended suitably with the ground beef to form a palatable product upon pan frying.

A comparable portion of the soy protein food material, per se, was substituted for the polymer/soy protein product in carrying out the pan frying test, the resulting pan fried product being dense, compact, and less flavorful, and hence less desirable than the pan fried hamburger/food product, above described.

A sample of the above described solidified extrudate was stored under high humidity conditions, and it retained a much higher degree of original crispness than is characteristic of conventional flake-type breakfast cereals.

An attempt to extrude the soy protein food material per se, was unsuccessful; it cound not be forced through the extruder die.

Example 5

The procedure of Example 4 was repeated except that glycerin was incorporated into the polymer-soy protein mixture to provide relative proportions of glycerin:soy protein:polymer of respectively 10:90:10; and the feed, barrel, and die zone temperatures were 125°, 140°, and 150° C. respectively. The solidified extrudate product was tan, brittle, and it maintained its body for a reasonable time upon chewing. It retained its physical integrity in cold water and softened significantly in hot water after 10 minutes. It functioned excellently as an ingredient in a patty mixed with ground beef and pan fried.

Example 6

The procedure of Example 1 was repeated except that the food component was wheat gluten to provide a polymer-wheat gluten mixture of 20 and 80 percent respectively. The feed zone, barrel and die zone temperatures were respectively 100°, 110°, and 120° C.

The solidified extrudate product was brittle, tan, and maintained its body for a reasonable time upon chewing; it retained its physical integrity in cold water, and softened in hot water and functioned excellently as an ingredient in a patty when mixed with ground beef and pan fried.

Example 7

Example 6 was repeated except that the wheat gluten-polymer weight ratio was 90:10. At this lower polymer proportion the solidified extrudate maintained its body upon chewing, for a time longer than that for the product of Example 6, and it functioned excellently in a patty mixed with the ground beef and pan fried.

Example 8

The procedure of Example 6 was repeated except that glycerin was incorporated into a wheat gluten-polymer mixture to provide relative weight ratios of glycerin to wheat gluten-polymer of 10:90:10 respectively. The solidified extrudate product was somewhat softer upon chewing than that of Example 6.

A portion of the solidified extrudate was tested as a breakfast cereal by breaking the extruded sheet into ½ inch × ½ inch pieces and adding milk. A desirable product was formed which maintained its body upon chewing for a time longer than that characteristic of conventional flake-type breakfast cereals. The extrudate product also functioned excellently as an ingredient in a ground beef patty and pan fried.

The extrusion procedure, above described, was repeated except in the absence of the polymer component, and was unsuccessful. The extrusion food product was non-cohesive.

Example 9

The procedure of Example 6 was repeated except that glycerin was incorporated into the polymer-wheat gluten mixture to provide a resulting mixture containing weight proportions of glycerin to wheat gluten to hydroxypropyl cellulose polymer respectively of 15:95:5. The solid extrudate product was similar to that obtained in Example 8 but was somewhat softer upon chewing.

Example 10

The procedure of Example 1 was repeated utilizing a vented extruder except that the food material component was a ground cooked beef having a particle size varying from fine powder to 1/16 inch, and a water content in the order of about 45 weight percent; and the polymer to cooked beef weight ratio was 20:80. The extruder temperatures were 132° C. in the feed zone, 143° C. in the barrel, and 160° C. in the die zone. Moisture vapor issued through the extruder vent. A tough, brown food product was obtained which maintained its body for a reasonable length of time upon chewing. It had a moisture content of 2 percent and maintained its physical integrity in both cold and hot water for a period of 10 minutes, after which it was removed without any physical disintegration; and it was especially suitable for pan frying when blended with water and fresh ground beef.

The procedure was repeated except in the absence of the polymer component, under which conditions the extrusion was not successful. The solidified extrudate was not cohesive.

Example 11

The procedure of Example 10 was repeated except that the cooked beef was in a weight ratio to the polymer of 90:10, and it had a final water content of 6 percent. The solidified extrudate product was as described with reference to Example 10.

Example 12

A "premix" of fine granulated sugar, fat, unsweetened chocolate, and table salt, on a relative weight basis of 88:6:6: trace was formed and milled with hydroxypropyl cellulose flake having an M.S. of 3.7, an intrinsic viscosity of 1.5 and a water solution viscosity (5 percent) of 140 centipoises. A first portion of the hydroxypropyl cellulose was banded on a 3 inches × 8 inches two-roll mill at a temperature of 110° C. Sufficient of the above premix was added to the polymer during the milling until banding (retention on the rolls) was no longer possible. Thereafter, the remaining portion of the polymer was added to the material on the rolls, to permit banding. At that point the composition of the total food product was 26 percent polymer, and 74 percent "premix." The above mixture of polymer and premix (26, 74 percent) was extruded in accordance with the extrusion procedure of Example 1 at a feed temperature of 127° C., a barrel temperature of 133° C., and a die zone temperature at 149° C. The solidified extrudate product was a tough, brown sheet which was chewy, and softened in water at room temperature; and it was particularly suitable as a candy bar component.

Example 13

The procedure of Example 10 was repeated except that the weight ratio of cooked beef to hydroxypropyl cellulose, which had an M.S. of 4.5, a water solution viscosity of 1,760 cps. (1 percent) and an intrinsic viscosity of 11, was 95:5. The feed zone, barrel, and die zone extrusion temperatures were respectively 125, 135, and 150° C. The solidified extrudate was a cohesive sheet which exhibited physical integrity in both cold and hot water as described with reference to Example 10.

For comparison purposes, three different polymer materials were extruded with cooked beef in the same ratio (95:5) and under the same extrusion temperatures (125°, 135°, and 150° C.) above described, namely, methyl cellulose having a D.S. of 1.2 and a 100 cps. water solution viscosity (2 percent), National Amylon 55 (a high amylose starch) and carboxymethyl cellulose having a D.S. of 0.82 and a water solution viscosity of 580 cps. (2 percent). "D.S." is the average number of hydroxyl groups substituted in the cellulose per anhydroglucose unit and is further described in U.S. Pat. No. 3,278,521.

In each of these comparative tests, the solidified extrudate obtained was non-cohesive and had very little, if any, physical integrity, and was powdery and flakey in form.

Example 14

The procedure of Example 13 was repeated except that the weight ratio of cooked beef to hydroxypropyl cellulose was 65:35, and the hydroxypropyl cellulose had an M.S. of 3.2 and a water solution viscosity of 230 cps. (10 percent solution), and an intrinsic viscosity of 1.0. The solidified extrudate contained 4 percent water, with approximately equal parts of beef and polymer. It had essentially the same characteristics as those of the solid food product of Example 10 except that it was a tougher sheet, and maintained its bogy for a longer time upon chewing.

Example 15

A "premix" of Example 12 was extruded with a hydroxypropyl cellulose having an M.S. of 3.9, a water solution viscosity of 118 cps. (5 percent) and an intrinsic viscosity of 1.5. The premix to polymer weight ratio was 96:4. The premix-polymer mixture was compression molded in an Elmo press using 10 inches square platens by heating at 149° C. for 4 minutes and then applying pressure at 1,000 psi. The compressed product was cooled by circulating water to 24° C. The final food product was a brown sheet 0.03 inch thick having a somewhat brittle resinous structure which softened in water, after 15 minutes, at ambient temperature.

The above procedure was repeated except in the absence of the polymer component. The final food product was non-cohesive and crumbly.

Example 16

One hundred (100) grams dehydrated carrot powder was dry blended with 10 grams of a hydroxypropyl cellulose having an M.S. of 3.2, a water solution viscosity of 230 cps. (10 percent) and an intrinsic viscosity of 1.0. The mixture was then extruded as described in Example 1. The resulting orange sheet was, upon cooling, hard and brittle, and exhibited physical integrity in both cold and hot water, and, upon breaking into small pieces, was especially suitable as a dry soup mix component.

Example 17

Finely divided pecans were dry blended with hydroxypropyl cellulose having an M.S. of 4.7, a water solution viscosity of 2,400 cps. (1 percent), in a pecan to polymer weight ratio of 95:5. The resulting mixture was extruded, and cooled, as described in Example 1 utilizing a ⅜ inch circular die. The respective feed zone, barrel, and die zone temperatures were 125°, 135°, and 150° C. The final rod shaped product had excellent physical integrity, maintained its body for a reasonable length of time upon chewing, and was moderately pliable in cold water for 10 minutes.

Example 18

Corn starch was blended with hydroxypropyl cellulose, having an M.S. of 4.7, a water solution viscosity of 240 centipoises (1 percent) and an intrinsic viscosity of 1.5. The weight ratio of starch to polymer was 70:30. The resultant admixture was molded at 175° C. in a Van Dorn screen type infection molding machine. The final product was white, hard and brittle, and maintained its integrity in cold water for a period of 10 minutes.

The above procedure was repeated except in the absence of the polymer; and the starch, alone, could not be molded.

Example 19

The process of Example 3 was repeated except with propylene glycol in place of the glycerin. The solidified extrudate product characteristics were the same as those of Example 3.

Example 20

A premix of a fine granulated sugar, fat, unsweetened chocolate, milk powder, glycerin, emulsifier, and table salt on a respective weight basis of 67.4:12:10:5:5:0.4:0.2 was admixed with a hydroxypropyl cellulose having an M.S. of 3.2, a water solution viscosity of 230 cps. (10 percent) and an intrinsic viscosity of 1.0. The weight ratio of premix to polymer was 90:10. The resulting admixture was extruded as described in Example 17, the respective feed, barrel, and die zone temperatures being 125°, 135°, and 150° C. The extrudate was formed into a ⅜ inch diameter rod. The solidified extrudate product was a moderately soft, brown rod having excellent chewiness and taste and particularly suitable as a candy bar ingredient.

Example 21

Vacuum dried-peach powder was dry blended with hydroxypropyl cellulose having an M.S. of 3.2, a water solution viscosity 0f 230 cps. (10 percent) and an intrinsic viscosity of 1.0. The weight ratio of peach powder to polymer was 90:10. The resulting mixture was extruded, and cooled, as described in Example 17. The final rod shaped product contained 3 percent water and it had peach color and flavor and an excellent physical integrity. It was moderately pliable in cold and hot water and maintained its body for a reasonable length of time upon chewing.

The above was repeated except in the absence of the polymer. The product could not be extruded satisfactorily.

Example 22

A premix was prepared in accordance with the following formulation:

| | Weight Percent |
|---|---|
| Table Salt | 47 |
| Hydrolyzed Vegetable Protein | 16 |
| Sugar | 12 |
| Monosodium Glutamate | 10 |
| Beef Fat, Rendered | 10 |
| Onion Powdered | 3 |
| Caramel | 1.4 |
| Pepper, Soluble | 0.5 |
| Celery, Soluble | 0.1 |

To 90 parts of the premix was added 10 parts of a hydroxypropyl cellulose having an M.S. of 3.2, an intrinsic viscosity of 1.0 and a water solution viscosity of 230 cps. (10 percent).

After blending, the resultant powder mixture was compression molded into ¼ inch bouillon cubes at 110° C. The final product was less hygroscopic than conventional bouillon products, and was readily dispersible in hot water yielding a somewhat cloudy bouillon having excellent flavor.

Example 23

Twenty parts of a hydroxypropyl cellulose having an M.S. of 3.7, a water solution viscosity of 140 centipoises (5 percent), and an intrinsic viscosity of 1.5, and 80 parts of wheat starch, were dry mixed. Twenty parts of water was added to, mixed with, and absorbed by, the dry polymer-wheat starched mixture. The resultant admixture was fed to an extruder containing a circular ½ inch die, and having an L/D ratio of 10:1. The temperatures in the feed zone, barrel, and die zone were 125°, 110°, and 150° C. respectively. The extrudate "steamed" as it emerged from the die and was then solidified by cooling; and the resulting solid rod shaped food product contained numerous voids, or bubbles, and had a somewhat irregular exterior surface due to the presence of broken bubbles. The density of the extruded, and thus "foamed" rod, was 0.32 grams per cc.

Example 24

A portion of the polymer-premix of Example 12 was extruded using a vented extruder having a ½ inch circular die. Freon 12 (octafluorocyclobutane) was pumped into the vent of the extruder at a rate of approximately 1 part per 20 parts of polymer-premix blend. The feed zone, barrel and die zone temperatures were about 110°, 120°, and 135° C. respectively. The solidified extrudate product was a foamed rod having a density of 0.15 grams per cc.

Example 25

The procedure of Example 13 was repeated except that the weight ratio of cooked beef to hydroxypropyl cellulose was 99:1. The polymer had an M.S. of 4.5, an intrinsic viscosity of 11, and a water solution viscosity of 1,760 cps. (1 percent). The feed zone, barrel, and die zone temperatures were respectively 125, 135, and 150° C. The solidified extrudate was a cohesive sheet which, upon chewing, was softer than the solidifed extrudate product of Example 10 and exhibited physical integrity in both cold and hot water as described with reference to the solidified extrudate product of Example 13.

As will be evident to those skilled in the art, various modifications can be made or followed, in light of the foregoing disclosure and discussion, without departing from the spirit or scope of the disclosure or from the scope of the claims.

I claim:

1. A process for the manufacture of an improved food product, which comprises thermoplastically shaping an admixture of a thermoplastic hydroxypropyl cellulose polymer having an M.S. of at least 2 and an intrinsic viscosity of about 0.5 to 20, and a solid food material, in a polymer to food material weight ratio of from 0.01:1 to 1:1, based on the weight of said food product; said shaping being accomplished by maintaining the polymer-food material admixture under temperature and pressure conditions sufficient to cause the admixture to soften and flow into the desired shape; during said shaping, vaporizing any water from said admixture initially present therein in excess of a predetermined proportion up to 15 weight percent; cooling the shaped admixture; and recovering the resulting shaped food product.

2. A process of claim 1 wherein said weight ratio of polymer to food material is within the range of from 0.05:1 to 0.3:1, and said M.S. is not greater than about 10.

3. A process of claim 2 wherein said M.S. is within the range of from 3 to 5.

4. The process of claim 2, wherein said food material component initially contains more than 15 weight percent water, based on said food product, and vaporizing a sufficient amount of said water from said admixture during said shaping to provide said food product containing not more than about 10 weight percent water.

5. The process of claim 2, wherein shaping said polymer-food mixture is by extrusion of same through an orifice.

6. The process of claim 2, wherein shaping said polymer-food admixture is by roll milling.

7. The process of claim 2, wherein shaping said polymer-food admixture is by comression, or injection molding.

8. The process of claim 2 wherein said food material is selected from the group consisting of sucrose, meats, vegetables, fruits, nuts, cereals, dried milk, and protein concentrates and mixtures thereof.

9. The process of claim 2 comprising admixing said food product with another food material, as an extender therefor.

* * * * *